H. A. JOHNSTON.
TRACTION MEANS FOR VEHICLE WHEELS.
APPLICATION FILED FEB. 3, 1913.

1,127,362.

Patented Feb. 2, 1915.
2 SHEETS—SHEET 1.

WITNESSES
H. C. Fliedner
Genevieve Ball

INVENTOR
H. A. Johnston
BY
M. Wright
ATTORNEY

H. A. JOHNSTON.
TRACTION MEANS FOR VEHICLE WHEELS.
APPLICATION FILED FEB. 3, 1913.
1,127,362.
Patented Feb. 2, 1915.
2 SHEETS—SHEET 2.
Fig.5.
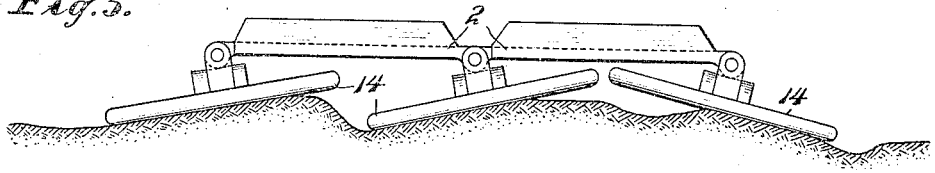
Fig.6.
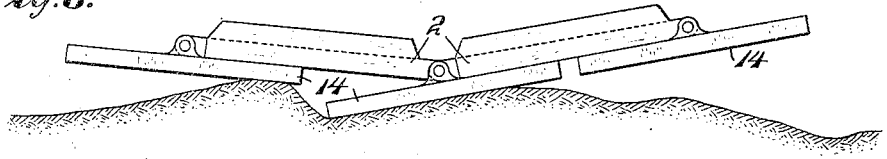
Fig.7.
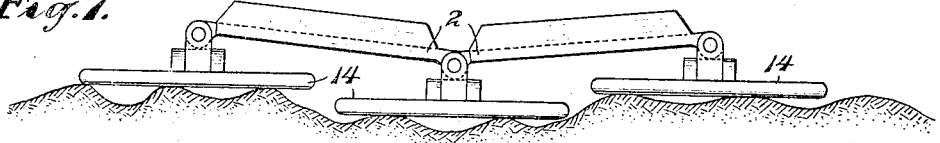
Fig.8.
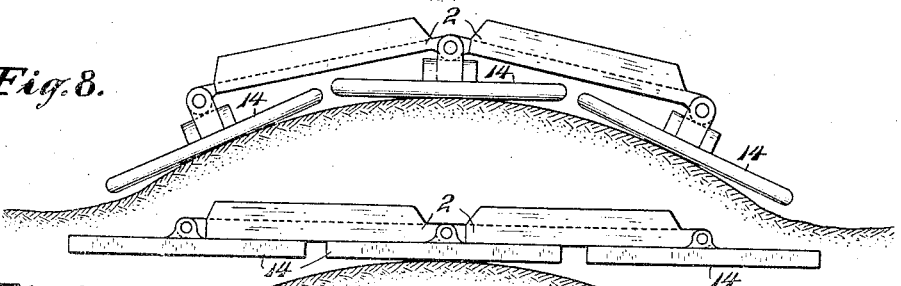
Fig.9.
Fig.10. Fig.11.
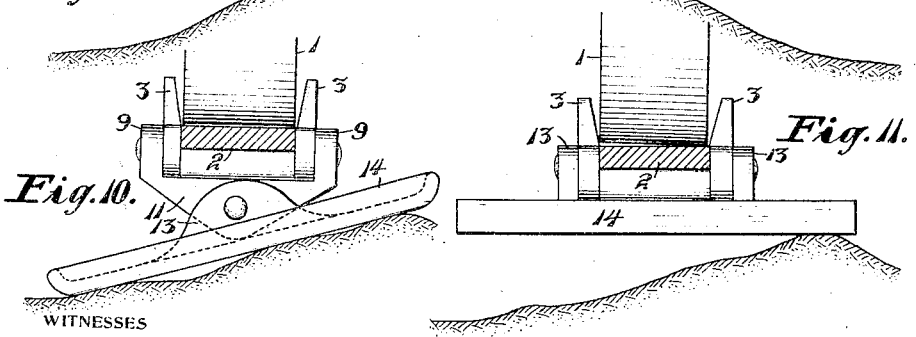
WITNESSES
H. C. Fiedner
Genereve Ball
INVENTOR
H. A. Johnston
BY
ATTORNEY

UNITED STATES PATENT OFFICE.

HARRY A. JOHNSTON, OF FRESNO, CALIFORNIA.

TRACTION MEANS FOR VEHICLE-WHEELS.

1,127,362.  Specification of Letters Patent.  Patented Feb. 2, 1915.

Application filed February 3, 1913. Serial No. 745,877.

*To all whom it may concern:*

Be it known that I, HARRY A. JOHNSTON, a citizen of the United States, residing at Fresno, in the county of Fresno and State of California, have invented new and useful Improvements in Traction Means for Vehicle-Wheels, of which the following is a specification.

The present invention relates to improvements in traction devices for wheeled vehicles, to enable them to be used to better advantages over soft ground, as that finely pulverized or cultivated, in which ordinary vehicle wheels sink.

The object of the invention is to provide a device of this kind which will enable the vehicle to be drawn over the ground with a small expenditure of force, and without packing it, a very important consideration in orchards or other land which is finely pulverized.

A further object of the invention is to provide such means which will facilitate the turning of the vehicle and adapt it to uneven ground.

Figure 1:
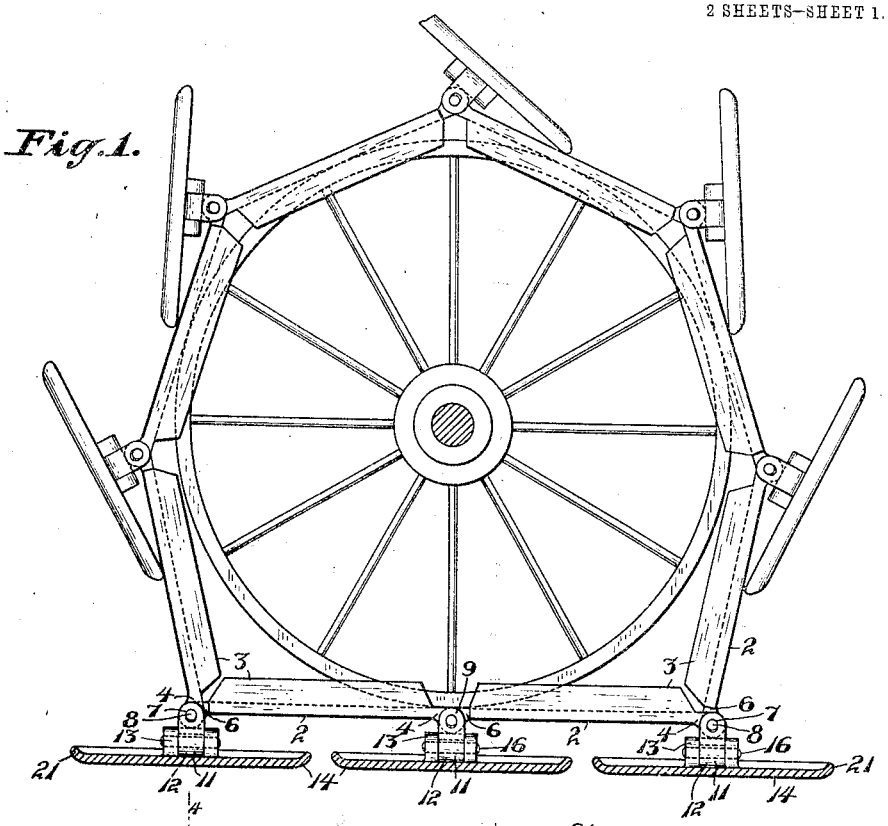
Figure 2:
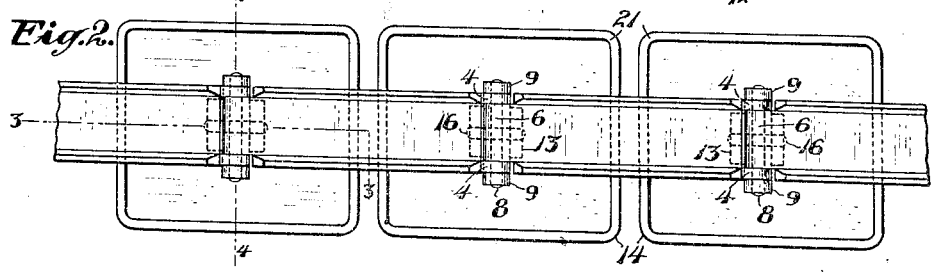
Figure 3:
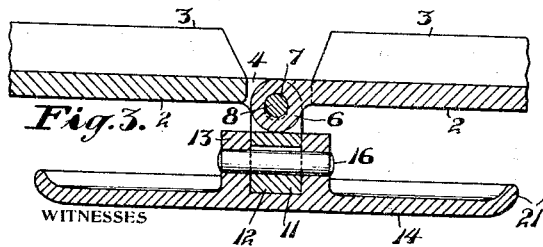
Figure 4:
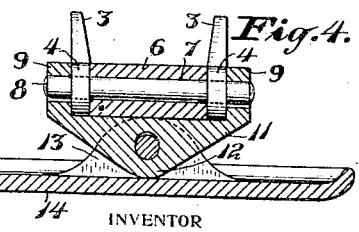

In the accompanying drawing Figure 1 is a side view of a vehicle wheel equipped with my improvement; Fig. 2 is a plan view of a portion of the traction device detached from the wheel; Figs. 3 and 4 are enlarged detail sections on the lines 3—3, 4—4, of Fig. 2; Fig. 5 is a detail view illustrating the operation of the device when moving over rough ground; Fig. 6 is a similar view illustrating the operation of such a device lacking an important feature of my invention; Fig. 7 is a view similar to Fig. 5 illustrating the operation of my apparatus on other ground; Figs. 8 and 9 are views similar to Figs. 5 and 6, illustrating the operations of said devices when passing over a ridge; Figs. 10 and 11 are similar views illustrating the transverse actions of the devices.

Referring to the drawing, 1 indicates an ordinary vehicle wheel, such as is used on tractors for agricultural and other purposes.

My improved traction means consists of a circular series of track sections 2, which are channel-shaped in form, having side walls or flanges 3 to engage the sides of the rim of the wheel. Each track section is formed at its ends with downward extensions, at one end with outer extensions 4, and at the other end with a central extension 6, of a width sufficient to fit snugly between the extensions 4 of an adjacent section, and said extensions are formed with registering apertures 7, through which can pass pivot pins 8. Said pivot pins extend beyond the outer extensions 4 a sufficient distance to pass also through holes in the upturned ends 9 of a yoke 11, which extends transversely beneath the ends of the adjacent track sections 2, the central depending member 12 of each yoke fitting between a pair of walls or ribs 13 formed near the center of a track support 14, said members and ribs being formed with registering holes through which passes a longitudinal pivot pin 16. The central member 12 of each yoke depends below said holes to such a depth that it is in contact with the upper side of the track support 14, and it is formed with a rounded lower edge so that the yoke can roll freely upon said track support, the weight transmitted from the vehicle wheel being borne by the track support, and not by the pivot pin 16. In like manner, the extensions 4 and 6 of the track sections are formed with rounded lower surfaces contacting with the member 12 so that the weight is transmitted through said member, and not through the pivot pin 8. It is to be observed that the pivots of the track sections and track supports to the yoke contain no closed chambers in which soil can lodge and prevent the free swinging of said yoke and track support. As the wheel revolves, each track section in turn on approaching the ground assumes a horizontal position, and each track support will also, if it can swing freely on its pivot 8, assume a horizontal position before it comes in contact with the ground. The number and size of these track sections bears such relation to the circumference of the wheel that, at all times, two track sections are horizontal and in contact with the ground, and in some positions, as shown in Fig. 1, three of such track sections may thus rest on the ground. Each track section is turned up at its ends, as shown at 21, for the following reasons: Supposing that, on reaching the ground, the track support, through undue friction of its pivots, or other cause preventing its swinging freely, comes into contact with the ground while still considerably inclined, its rear edge, that is, the edge which first comes in contact with the ground, tends to dig into the ground. To obviate this difficulty the ends of the track supports are curved upwardly so that, when moving in either direction, the rear end of the track support, if it should not swing freely, will, when it comes in contact with the ground force the track support to a horizontal position. I also form the track supports with upwardly curved side edges. This is done to facilitate the turning of the vehicle, for it is found that, in making such a turn, if the track support is made with its side edges level with the bottom of the support, then, when the wheel turns, the track support will dig into the ground at the side toward which the wheel is turning. This greatly retards the action of the vehicle wheel and renders it impossible to make a short turn with it. As this device is designed primarily for drawing cultivators, plows and the like through orchards and vineyards where it is necessary to make short turns, the advantage of this construction is obvious.

It is an important feature of my invention that the track supports are so transversely connected with the track sections that the upper surfaces of the ends of said track supports are at a considerable depth below the lower surfaces of the track sections with which they are so connected, that is, so that said track supports can be inclined longitudinally to said track sections at a considerable angle. I have illustrated the advantage of this construction in traveling over level but uneven ground in Figs. 5 and 6, Fig. 5 illustrating my construction in which the upper surface of the track support is at considerable depth below the lower surfaces of the corresponding track sections, while Fig. 6 illustrates a device in which this feature is lacking. It will be observed that with my construction the track supports can rest on uneven ground at a very considerable angle with each other while the track sections are substantially level. With the construction shown in Fig. 6 this is not the case. In Fig. 5, the wheel is supported by three track supports whereas in Fig. 6, it is only supported on two of them. Likewise on ground such as that illustrated in Fig. 7, the wheel is supported on three track supports, which would not be the case without the above feature. Again when passing over a ridge or elevation, when the aforesaid feature is not present in the device, the effect would be, as illustrated in Fig. 10, that as the wheel passed over the apex of said ridge or elevation, and began to descend on its other side that a teetering or balancing action would take place having the apex of the ridge as a fulcrum. As shown in Fig. 9, with this feature of the construction no such teetering effect occurs, but the wheel makes a gradual ascent and descent, this being due to the construction by which the track supports may be considerably inclined to the track sections.

The reason for providing pivots 16 extending in the longitudinal or circumferential directions of the wheel is that the track supports can swing transversely to the wheel so as to enable the wheel to travel over uneven ground, the track supports conforming in inclination to that of the surface of the ground. Were this transverse movement of the track supports not permissible, the result would be that, if any one or more track supports, in passing over uneven ground, were not horizontal, but inclined to one side, in consequence of which the wheel would ride on one side of the track as illustrated in Fig. 11, which not only quickly wears out the device but greatly reduces the traction surface. By providing this transverse freedom of movement of the track supports, the track sections will not be inclined transversely even when moving over uneven ground, as illustrated in Fig. 10.

I claim:—

1. The combination, with a vehicle wheel, of track sections, having at their ends downward extensions, transverse pivot pins through said extensions whereby said track sections are pivotally connected together in a circular series around the wheel, each track section having means for engaging the wheel to prevent separation therefrom, a series of track supports, a yoke for each track support, a longitudinal pivot pin by which said support is pivoted to the yoke, the sides of the yoke being pivoted on the adjacent transverse pivot pin, the upper surface of the sides and ends of each track support being sufficiently below the lower surfaces of said adjacent sections to permit it to swing longitudinally and transversely.

2. The combination, with a vehicle wheel, of track sections, having at their ends outer downward extensions and central downward extensions each between the outer extensions of an adjacent section, a transverse pivot pin through each central extension and the adjacent outer extensions, whereby said track sections are pivotally connected together in a circular series around the wheel, each track section having means engaging the wheel to prevent separation therefrom, a series of track supports, a yoke for each track support, having a rounded surface in contact therewith, a longitudinal pivot pin by which said support is pivoted to the yoke, the sides of the yoke being pivoted on the adjacent transverse pivot pin, the said central and outer extensions having rounded lower surfaces in contact with the middle member of said yoke, each track support having at its sides and ends an upper surface sufficiently below the lower surfaces of said adjacent sections to permit it to swing longitudinally and transversely.

In testimony whereof I have hereunto set my hand in the presence of two subscribing witnesses.

HARRY A. JOHNSTON.

Witnesses:
 FRANCIS M. WRIGHT,
 D. B. RICHARDS.